United States Patent
Ylitalo et al.

(10) Patent No.: US 7,286,612 B2
(45) Date of Patent: Oct. 23, 2007

(54) METHOD OF TRANSMITTING DATA FROM A TRANSMITTER TO A RECEIVER, AND A RADIO SYSTEM

(75) Inventors: Juha Ylitalo, Oulu (FI); Kari Horneman, Oulu (FI); Marcos Katz, Oulu (FI); Markku Juntti, Oulu (FI)

(73) Assignee: Nokia Corporation, Espoo (FI)

( * ) Notice: Subject to any disclaimer, the term of this patent is extended or adjusted under 35 U.S.C. 154(b) by 817 days.

(21) Appl. No.: 10/184,054

(22) Filed: Jun. 28, 2002

(65) Prior Publication Data
US 2003/0022636 A1   Jan. 30, 2003

Related U.S. Application Data

(63) Continuation of application No. PCT/FI00/01134, filed on Dec. 21, 2000.

(30) Foreign Application Priority Data
Dec. 30, 1999   (FI) .................................. 19992829

(51) Int. Cl.
*H04L 27/00* (2006.01)
(52) U.S. Cl. ...................... 375/295; 375/267
(58) Field of Classification Search ........ 375/259–261, 375/265, 267, 285, 295, 298, 316, 346–349, 375/341, 344; 455/504, 506, 103, 132–137, 455/272; 370/336, 342, 337, 441, 479
See application file for complete search history.

(56) References Cited

U.S. PATENT DOCUMENTS 5,233,633 A * 8/1993 Baum et al. ................. 375/344

(Continued)

FOREIGN PATENT DOCUMENTS

GB   2297224   7/1996

(Continued)

OTHER PUBLICATIONS

John G. Proakis "Digital Communications", Fourth Edition, Aug. 2000.*

(Continued)

*Primary Examiner*—Khanh Tran
(74) *Attorney, Agent, or Firm*—Pillsbury Winthrop Shaw Pittman LLP; Larry J. Hume (57) ABSTRACT

The invention relates to a method of transmitting data from a transmitter to a receiver in a radio system, and to a radio system. The method includes the following: channel-coding the data using selected channel-coding; dividing the channel-coded non-interleaved data into signals with different contents, to be transmitted via at least two different transmitter antennas; providing the signal to be transmitted via each transmitter antenna with an identifier, by means of which identifier the signals transmitted via different transmitter antennas are distinguishable from each other in the receiver; transmitting the signals to the receiver using different transmitter antennas; detecting the signal transmitted via each transmitter antenna with a receiver receiving each transmitter antenna in the receiver, and combining the detected signals into received channel-coded non-interleaved data; decoding the channel-coding of the received channel-coded non-interleaved data; and the receiver attenuating interference utilizing the decoded data.

32 Claims, 7 Drawing Sheets

U.S. PATENT DOCUMENTS

| | | | |
|---|---|---|---|
| 5,859,875 A | | 1/1999 | Kato et al. |
| 5,914,946 A * | | 6/1999 | Avidor et al. ............... 370/336 |
| 6,115,427 A * | | 9/2000 | Calderbank et al. ........ 375/267 |
| 6,178,196 B1 * | | 1/2001 | Naguib et al. .............. 375/148 |
| 6,310,923 B1 * | | 10/2001 | Lee et al. ................... 375/267 |
| 6,359,864 B1 * | | 3/2002 | Yoshida et al. ............. 370/318 |
| 6,560,295 B1 * | | 5/2003 | Hammons et al. .......... 375/299 |
| 6,678,263 B1 * | | 1/2004 | Hammons et al. .......... 370/342 |
| 6,693,982 B1 * | | 2/2004 | Naguib et al. .............. 375/341 |
| 6,728,307 B1 * | | 4/2004 | Derryberry et al. ......... 375/219 |
| 6,741,658 B1 * | | 5/2004 | Ionescu ...................... 375/267 |
| 6,898,248 B1 * | | 5/2005 | Elgamal et al. ............. 375/259 |

FOREIGN PATENT DOCUMENTS

| | | |
|---|---|---|
| WO | WO 97/41670 | 11/1997 |
| WO | WO 99/04519 | 1/1999 |
| WO | WO 99/14871 | 3/1999 |
| WO | WO 99/23766 | 5/1999 |
| WO | WO 99/45657 | 9/1999 |
| WO | WO 99/56406 | 11/1999 |

OTHER PUBLICATIONS

Hammons, Jr. et al., U.S. Appl. No. 60/153,936, "Construction of Space-Time Codes for Generalized Layered Space-Time Architectures", filed Sep. 15, 1999.*

Li et al., "Transmitter Diversity for OFDM Systems and Its Impact on High-Rate Data Wireless Networsk," IEEE Journal on selected areas in communication, Jul. 1999, vol. 17, No. 7, pp. 1233-1243.

Muszynski, "Interference Rejection Rake-Combining for WCDMA," Proceedings of First International Symposium on Wireless Personal Multilmedia Communications (WPMC), Nov. 4-6, 1998, Yokosuka, Japan, pp.

Bottomley et al, "Adaptive Arrays and MLSO Equalization," Proceedings of the 45th IEEE Vehicular Technology Conference (VTC), 1994, pp.

* cited by examiner

METHOD OF TRANSMITTING DATA FROM A TRANSMITTER TO A RECEIVER, AND A RADIO SYSTEM

This application is a Continuation of International Application PCT/FI00/01134 filed on the 21st of Dec. 2000, which designated the U.S. and was published under PCT Article 21(2) in English.

FIELD

The invention relates to a method of transmitting data from a transmitter to a receiver in a radio system, and a radio system.

BACKGROUND

In known radio systems, the digital information to be transmitted is channel-coded in a transmitter to prevent detrimental effects caused by the noise on the radio path. In addition, in CDMA (Code Division Multiple Access) radio systems, multiple access interference, MAI, which is caused by the non-orthogonality of the users' spreading codes, deteriorates the performance of the receiver and thus the capacity of the system.

The channel codes can in principle be divided into block codes and convolutional codes. Both coding methods can be used simultaneously as well. A typical code rate of convolutional coding, i.e. the ratio of the number of data bits of the user to the coded data bits of the channel, is for example ½ or ⅓. The constraint length of the channel coding expresses how many successive data bits affect the code word resulting from the channel coding of each data bit.

The channel decoder of the receiver utilizes the redundancy of data bits, whereby coding gain is achieved. If the noise interfering with each bit is assumed to be uncorrelated, the total effect of the added redundancy is that the desired signal is amplified at the same time as the effect of the noise averages out. In this way, the reliability of the bit decisions made by the receiver is increased, which improves the performance of the radio link, for example the bit error ratio is lowered.

Generally, it can be said that channel coding gives protection against the effect of additive white Gaussian noise, AWGN. Interleaving is frequently used in addition to channel coding. In interleaving, the successive bits are mixed with each other over a longer time interval in such a way that a momentary fade on the radio path would not be sufficient to make the radio make the radio signal of that time interval unrecognizable but that the errors affecting it could still be cancelled by means of the decoding of the channel coding.

Space-time coding has been presented to improve the performance of the channel coding on fading channels. This new way of coding refers to channel coding in which also spatial diversity is utilized. One way to implement the spatial diversity is to use transmitter antennas that are sufficiently far away, for example at 10 to 20 wavelengths, from each other. Another way to implement the diversity is to use polarization diversity, in which a signal is transmitted from antennas using different polarization levels.

One of the simplest ways to implement the time-space coding is to code the data with a channel code, for example with a ½ convolutional code and then to convert the serial data flow into parallel. The conversion can be made in such a way, for instance, that two successive symbols of a code word are transmitted in a parallel manner. Each of the parallel data flows is then transmitted via a transmitter antenna of its own. More advanced codes, for example trellis codes, can also be used.

In other words, channel coding utilizes redundancy in the time domain to overcome the problems on the AWGN channel. Channel coding is not sufficient on its own on fading channels, because the coherence time of the channel is usually much longer than the duration of a symbol. This is alleviated by interleaving, but it causes significant delays in decoding, particularly in environments where the subscriber terminal moves slowly, for instance indoors. The problem of the delays in the decoding makes the designing of receivers operating at a high transmission speed particularly indoors more difficult.

In an uplink, in particular, MUD (multi-user detection) receivers utilizing interference cancellation can be used to fight the effects of the multiple access interference. This type of receiver receives signals from several users, and then the multiple access interference caused by the other users is estimated and cancelled from the received signal so as to receive the signal of the desired user.

Incorporated herein by reference is the article by Muszynski, Peter: *Interference Rejection Rake-Combining For WCDMA* in Proceedings of the First International Symposium on Wireless Personal Multimedia Communications (WPMC) Nov. 4-6, 1998 Yokosuka Japan, which describes an IRC (Interference Rejection Combining) receiver which contributes to eliminating the effect of interference and noise from the received signal.

Incorporated herein by reference is also the article by Bottomley, Gregory E and Jamal, Karim: *Adaptive Arrays and MLSE Equalization* in Proceedings of the $45^{th}$ IEEE Vehicular Technology Conference (VTC) 1995, which describes the performance of MLSE equalization (Maximum Likelihood Sequence Estimation Equalization) of a receiver utilizing receiver antenna diversity so as to reduce the interference of the received signal.

The cancellation of the multiple access interference is based on tentative decisions of the other users' data symbols, and therefore it can be repeated several times, so that at each time, the new decisions are used as new tentative decisions. The reliability of the decisions is thus improved iteratively. Typically, for example two interference cancellation stages are used.

Since interleaving is used in connection with channel coding, the tentative decisions are "raw" decisions, in other words they are not based on decisions made after the decoding of the channel coding. The decoding is performed prior to the final decisions. If the channel decoding were performed prior to the estimation and cancellation of the multiple access interference, the received signal should be buffered over the length of the interleaving depth. This causes two problems: a long decision delay and large memory buffers to collect the interleaved data.

BRIEF DESCRIPTION

An object of the invention is to provide an improved method of transmitting data from a transmitter to a receiver in a radio system, and an improved radio system. One aspect of the invention is a method of transmitting data from a transmitter to a receiver in a radio system, comprising: channel-coding the data using selected channel-coding; dividing the channel-coded non-interleaved data into signals with different contents, to be transmitted via at least two different transmitter antennas; providing the signal to be transmitted via each transmitter antenna with an identifier, by means of which identifier the signals transmitted via different transmitter antennas are distinguishable from each other in the receiver; transmitting the signals to the receiver using different transmitter antennas; detecting the signal transmitted via each transmitter antenna with a receiver receiving each transmitter antenna in the receiver, and combining the detected signals into received channel-coded non-interleaved data; decoding the channel-coding of the received channel-coded non-interleaved data; and the receiver attenuating interference utilizing the decoded data. Another aspect of the invention is a radio system comprising a transmitter and a receiver connected to a transmitter, which transmitter comprises a channel encoder for channel-coding data and at least two transmitter antennas for transmitting the channel-coded data, and the receiver comprises a receiver per each transmitter antenna for detecting the signal transmitted via the transmitter antenna in question, and the transmitter further comprises: means for dividing the channel-coded non-interleaved data into signals with different contents, to be transmitted via at least two different transmitter antennas; and means for providing the signal to be transmitted via each transmitter antenna with an identifier, by means of which identifier the signals transmitted via different transmitter antennas are distinguishable from each other in the receiver; and the receiver further comprises: means for combining the signals transmitted via different transmitter antennas into received, channel-coded non-interleaved data; a channel decoder for decoding the channel-coding of the received channel-coded non-interleaved data; and interference attenuation means for attenuating interference by utilizing the decoded data.

The invention is based on the idea of replacing the interleaving with the use of transmitter diversity antennas, whereby decoding of the channel-coding can be performed prior to the estimation and cancellation of the multiple access interference in the receiver. The decoded data can then be utilized to attenuate the interference in the receiver. This improves the cancellation of the interference. Hereby, the radio system can have more users at the same time, in other words the transmission capacity of the radio system can be increased with the method according to the invention.

LIST OF DRAWINGS

Preferred embodiments of the invention will be described by way of example, with reference to the attached drawings, of which

DESCRIPTION OF EMBODIMENTS

The examples describe the use of the invention in a universal mobile telecommunications system, UMTS, using a wideband code division multiple access method, without limiting the invention to this, however. The presented solution can also be applied to TDMA (Time Division Multiple Access) systems, such as the GSM (Global System For Mobile Communication) system.

Figure 1A:
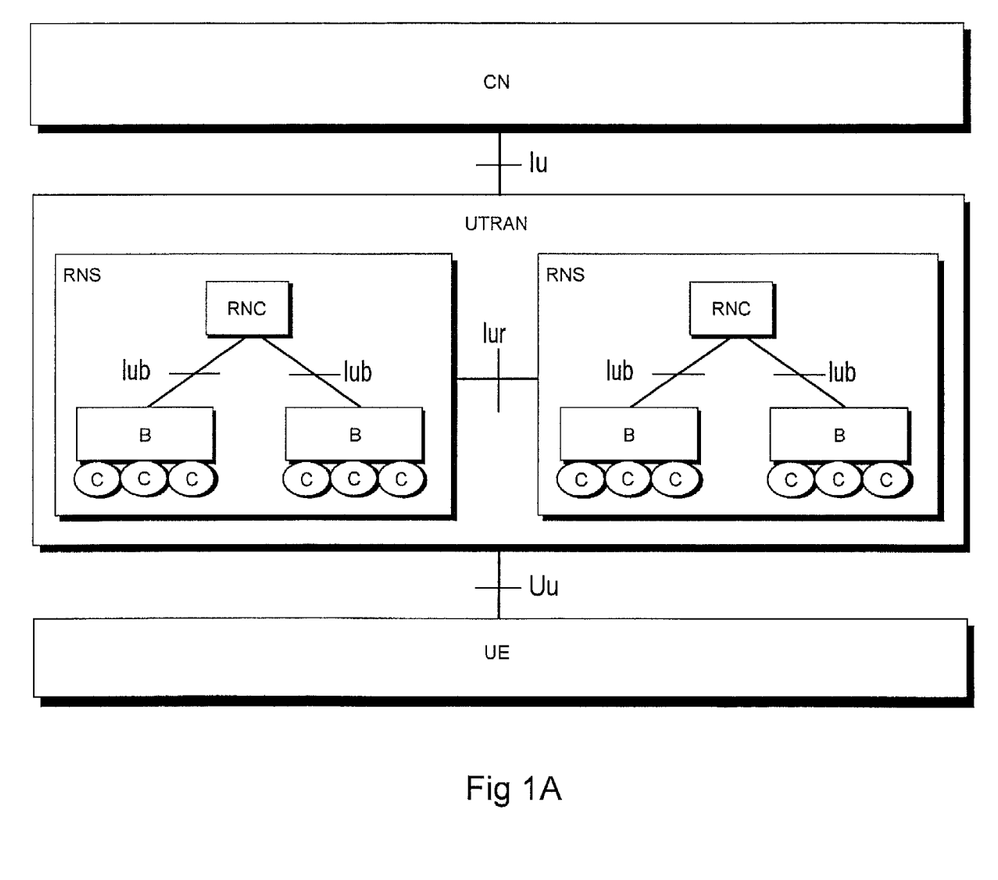
FIGS. 1A and 1B show an example of the structure of a radio system.
Figure 1B:
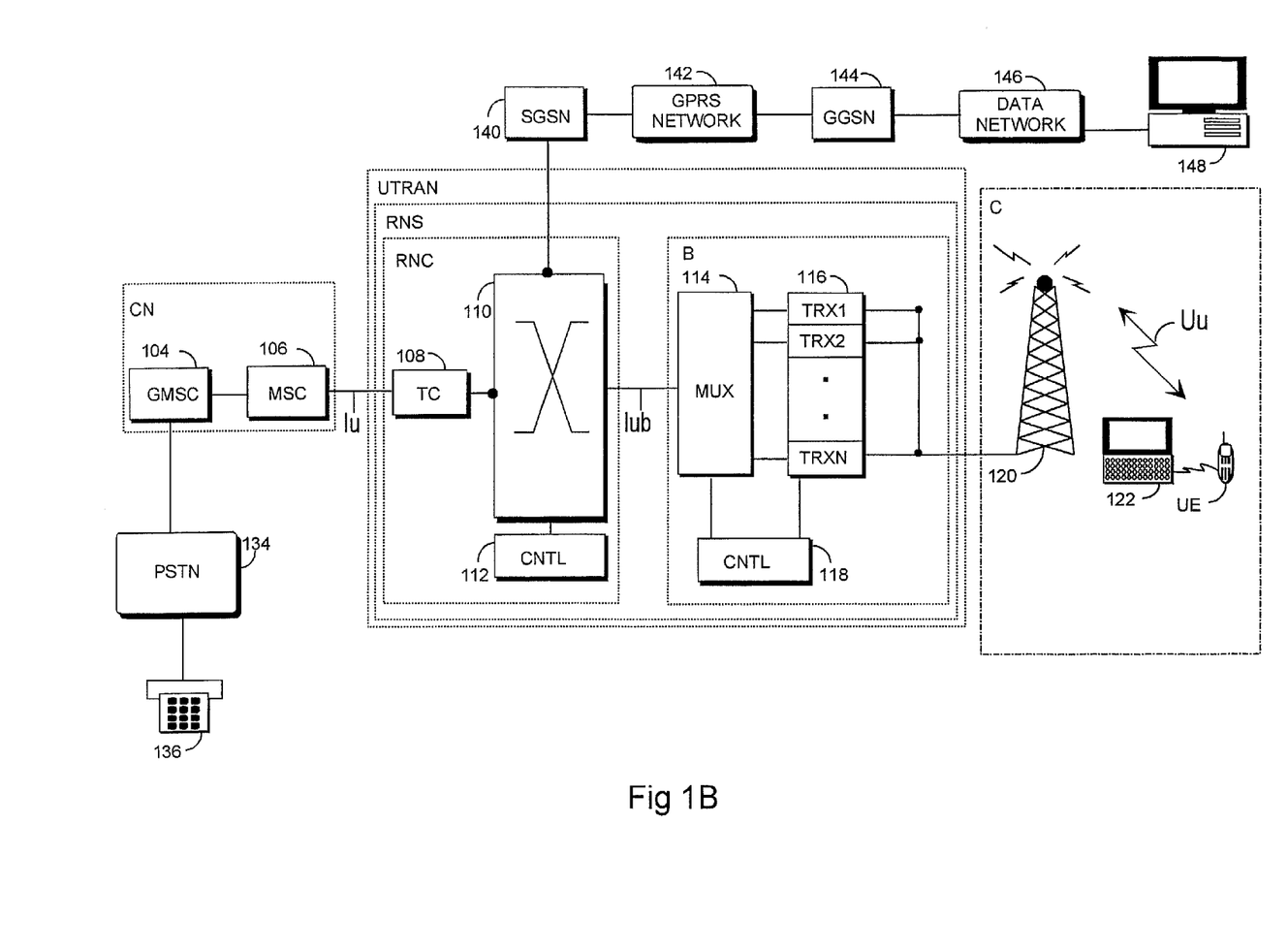

With reference to FIGS. 1A and 1B, the structure of a universal telecommunications system is described. FIG. 1B only contains the blocks essential for the clarification of the invention, but it is obvious to a person skilled in the art that a conventional mobile communications system also contains other functions and structures, the detailed explanation of which is not necessary herein. The main parts of the mobile communications system are a core network CN, a UMTS terrestrial radio access network UTRAN, and user equipment UE. The interface between the CN and the UTRA is called Iu, and the air interface between the UTRA and the UE is called Uu.

The UTRAN is formed of radio network subsystems RNS. The interface between the RNSs is called Iur. The RNS is formed of a radio network controller RNC and one or more nodes B. The interface between the RNC and B is called Iub. The coverage area of the node B, i.e. the cell, is denoted by C in FIG. 1B.

The illustration of FIG. 1A is very abstract, so that it is clarified in FIG. 1B by showing which part of the GSM system approximately corresponds to which part of the UMTS. It is to be noted that the illustration is not in any way binding but indicative only, as the tasks and functions of the different parts of the UMTS are still at the design stage.

In the way shown in FIG. 1B, a circuit-switched connection can be formed from the user equipment UE to a telephone 136 or other terminal connected to a public switched telephone network 134. The user equipment UE can be for example a terminal that is fixedly positioned or positioned in a vehicle, or a portable terminal. The infrastructure of the radio network UTRAN is formed of radio network subsystems RNS, i.e. base station systems. The radio network subsystem RNS is formed of a radio network controller RNC, i.e. a base station controller and at least one node B, i.e. base station, controlled by the base station controller.

The base station B comprises a multiplexer 114, transceivers 116 and a control unit 118, which controls the operation of the transceivers 116 and the multiplexer 114. The multiplexer 114 is used to position the traffic and control channels used by several transceivers 116 into the transmission link Iub.

There is a connection from the transceivers 116 of the base station B to the antenna unit 120, by means of which a bidirectional radio connection Uu is implemented to the user equipment UE. In the bidirectional radio connection Uu, the structure of the frames to be transmitted is defined accurately.

The radio network controller RNC comprises a group switching network 110 and a control unit 112. The group switching network 110 is used to switch speech and data and to connect signalling circuits. The base station system formed of the base station B and the radio network controller RNC also comprises a transcoder 108. The division of tasks and the physical structure of the radio network controller RNC and the base station B can vary depending on the implementation. Typically, the base station B attends to the implementation of the radio path in the way described above. The radio network controller RNC typically controls the following: control of the radio resources, control of the handover between cells, power control, timing and synchronizing, paging the user equipment.

The transcoder 108 is usually positioned as near the mobile services switching centre 106 as possible, since the speech can thus be transmitted in the format of a mobile telephone system between the transcoder 108 and the radio network controller RNC in such a way that transmission capacity is saved. The transcoder 108 converts the different digital speech coding formats of speech used between the public switched telephone network and the radio telephone network into a compatible mode, for example from the mode of a fixed network 64 kbit/s into another mode of a cellular network (for example 13 kbit/s), and vice versa. The required equipment is not described in more detail herein, but it can be observed that conversion is not performed for other data except for speech in a transcoder 122. A control unit 112 performs call control, mobility management, collection of statistical data and signalling.

The core network CN is formed of an infrastructure outside the UTRAN and belonging to a mobile telephone system. FIG. 1B shows the following of the equipment of the core network CN: a mobile services switching centre 106 and a gateway mobile services switching centre 104, which attends to the connections of the mobile telephone system to the outside world, here to the Internet 146.

In a radio system, packet-switched transmission can also be used, implemented by the GPRS (General Packet Radio Service), for example. The GPRS is a service in which transmission capacity free of circuit switching of the air interface can be used for packet transmission. Since the GPRS is a GSM-based advancing service, it is not described herein how the GPRS is to be technically adapted so as to be used in the UMTS.

As can be seen from FIG. 1B, the switching network 110 can be used to perform switching (denoted by black spots) both to the public switched telephone network 134 via the mobile services switching centre 106 and to a packet transmission network 142. Packet transmission is performed via the Internet 146 from a computer 148 connected to a mobile communications system to a portable computer 122 connected to the user equipment UE.

The connection between the packet transmission network 142 and the switching network 110 is created by a serving GPRS support node, SGSN 140. The task of the support node 140 is to transmit packets between the base station system and the gateway GPRS support node 144, and to keep a record of the position of the user equipment UE in its area.

The gateway GPRS support node 144 connects the public packet transmission network 146 and the packet transmission network 142. An Internet protocol or an X.25 protocol can be used in the interface. The gateway GPRS support node 144 conceals the internal structure of the packet transmission network 142 from the public packet transmission network 146 by means of encapsulation, so that the packet transmission network 142 seems a subnetwork relative to the packet transmission network 146, whereby the public packet transmission network 146 can address packets to the user equipment UE in the subnetwork and receive packets therefrom.

The packet transmission network 142 is typically a private network using an Internet protocol and transporting signalling and user data. The structure of the network 142 can vary in an operator-specific manner, as regards to both the architecture and protocols thereof below the Internet protocol layer.

The public packet transmission network 146 can be for example the global Internet, there being a terminal 148, for instance a server, connected thereto, which wishes to transmit packets to the user equipment UE.

Figure 2:
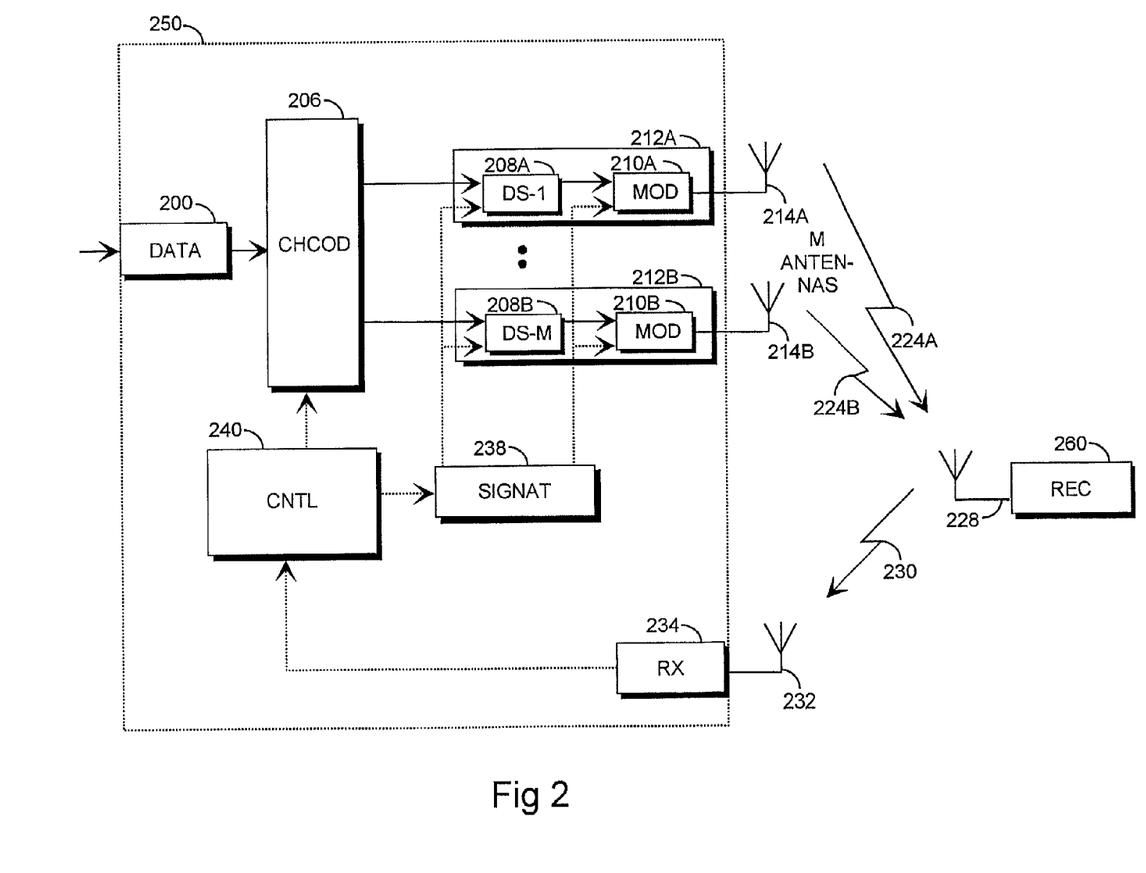
FIG. 2 shows an example of the structure of a transmitter.

FIG. 2 is a simplified block diagram illustrating an example of the structure of a radio transmitter. A transmitter 250 naturally comprises other functions besides the ones illustrated, but since they are not relevant for the invention and since they are obvious to a person skilled in the art, they are not described in this context. The transmitter 250 can be positioned in the node B or in the user equipment UE. Correspondingly, a radio receiver 260 can be positioned in the user equipment UE or in the node B.

Data 200 of a service transmitted on the radio channel can be for example speech, data, moving video images, or photographs. Different services require different source coding means; speech, for instance, requires a speech codec. For the sake of simplicity, however, these are not illustrated in FIG. 2. Further, control data of the system, for example different control channels, can be positioned in the data 200.

The data 200 is channel-coded in a channel encoder 206 using selected channel-coding, for example convolutional coding described earlier, with a desired code rate. Selection of the code rate is mainly affected by the quality requirement of the service to be transmitted on the channel. Other channel codes that can be used include block codes, an example of which is cyclic redundancy check, CRC. Different variants of convolutional coding can also be used, for example punctured convolutional coding or concatenated convolutional coding, i.e. turbo coding. The channel encoder 206 is controlled by a control part 240 of the transmitter.

According to the prior art, the channel-coded data would then be interleaved in an interleaver. Here, however, the interleaving is not performed but it is replaced by the use of transmitter diversity antennas 214A, 214B. In FIG. 2, M pieces of transmitter diversity antennas 214A, 214B can be selected, M being an integer greater than one. The first antenna is denoted by reference numeral 214A and the $M^{th}$ antenna by reference numeral 214B. The transmitter antennas can be spatial diversity antennas or polarization diversity antennas, the beam shape of which covers the whole sector. Typically, base stations with three sectors are used, in which one sector is 120 degrees. The transmitter antennas 214A, 214B can also implement angle diversity using directed antenna beams, for example antenna beams created by means of the Butler matrix. Hereby, one 120-degree sector of the base station is covered by four 30-degree beams, for example.

The selection of an appropriate combination of channel-coding and transmitter diversity is performed by a coding algorithm operating in the control part 240. The number of antennas used in the transmission depends on the desired diversity gain. The number can be set dependent on the code rate or constraint length of the channel-coding used. If, for example, it is desired that the signals transmitted via different antennas 214A, 214B are as uncorrelated relative to each other as possible, the number of transmitter antennas 214A, 214B is the constraint length of the channel-coding used, or if weaker diversity gain is sufficient, the number of transmitter antennas 214A, 214B is at most the inverse of the maximum code rate of the channel-coding used. The coding algorithm implements the use of the transmitter diversity for example in such a way that the serial data resulting from the channel-coding is converted into a parallel coded signal vector corresponding to each selected transmitter antenna 214A, 214B. The conversion can be performed for instance by using a conversion matrix.

The algorithm can change the code rate and the number of transmitter antennas 214A, 214B adaptively. As an example of the adaptability it can be mentioned that when the code rate is kept the same and the number of transmitter antennas 214A, 214B is increased, the transmission speed of the data 200 to be transmitted is increased. Another example is that when the code rate is reduced and the number of transmitter antennas 214A, 214B correspondingly increased, the transmission speed of the data 200 to be transmitted remains the same.

The control part 240 can also decide on the transmission power of each transmitter antenna 214A, 214B on the basis of the quality values of the received signal computed in the receiver 260. Hereby, the receiver 260 comprises means 322 for computing a quality value for a received signal of each transmitter antenna 214A, 214B. The quality value can be any variable expressing the quality of the received signal, for example a SINR ratio (signal-to-interference-plus-noise ratio). Naturally, the transmitter 250 thus also comprises a receiver 234 with a receiver antenna 232, connected to the control part 240, so that signalling 230 transmitted by the receiver 260 can be received in the transmitter 250. Signalling can contain quality values or control data formed on the basis of the quality values in the receiver 260. The transmitter 250 decides the transmission power on the basis of the quality values and the control data.

The transmitter 250 comprises means 206, 240 for dividing the channel-coded non-interleaved data into signals 224A, 224B with different contents, to be transmitted via at least two different transmitter antennas 214A, 214B. In practice, the coding algorithm in the control part 240 controls the operation of the channel encoder 206 in such a way that the channel-coded non-interleaved data is divided into at least two different parts. In FIG. 2, these signals with different contents are illustrated by blocks 208A, 208B and in the air interface also by reference numerals 224A, 224B.

The transmitter 250 also comprises means 238 for providing the signal 224A, 224B to be transmitted via each transmitter antenna 214A, 214B with an identifier. By means of the identifier the signals 224A, 224B transmitted via the separate antennas 214A, 214B are distinguishable from each other in the receiver 260. The identifier can be for example a spreading code used for spreading the signal, or a known reference symbol sequence added to the signal, such as a pilot symbol sequence or a training sequence, or some other distinguishing means that is identified by the receiver 260. The control part 240 also controls the operation of the means 238.

The different signals 208A, 208B are then transmitted, each from a separate transmission block 212A, 212B. Transmission block 212A, 212B refers here to the functionality performed in the transmission, in other words on the hardware level, the transmission blocks 212A, 212B can be implemented as separate pieces of hardware components or as one piece of hardware. Each transmission block 212A, 212B comprises a modulation block 210A, 210B, which transmits on the radio channel the modulated channel-coded non-interleaved data, and in addition, each modulation block 210A, 210B is connected to the transmitter antenna 214A, 214B. The number of transmission blocks is also M.

The control information of the system is added to the data flow in the transmission block 212A, 212B, as shown in FIG. 2 by the broken line from the block 240 to the block 238, and further to the blocks 210A, 210B.

In the modulation block 210A, 210B the signal is modulated, for example it is spread by means of the selected spreading code. The modulation block 210A, 210B can further comprise power amplifiers and band-pass filters. The analogue radio signal formed is then transmitted to the radio path 224A, 224B via the selected antennas 214A, 214B.

The channel encoder 206 of the transmitter 250, the control part 240, the means 206 and the means 238 are preferably implemented as software performed in the processor, but a partial or complete hardware implementation is possible using an application-specific integrated circuit (ASIC), for example.

Figure 3A:
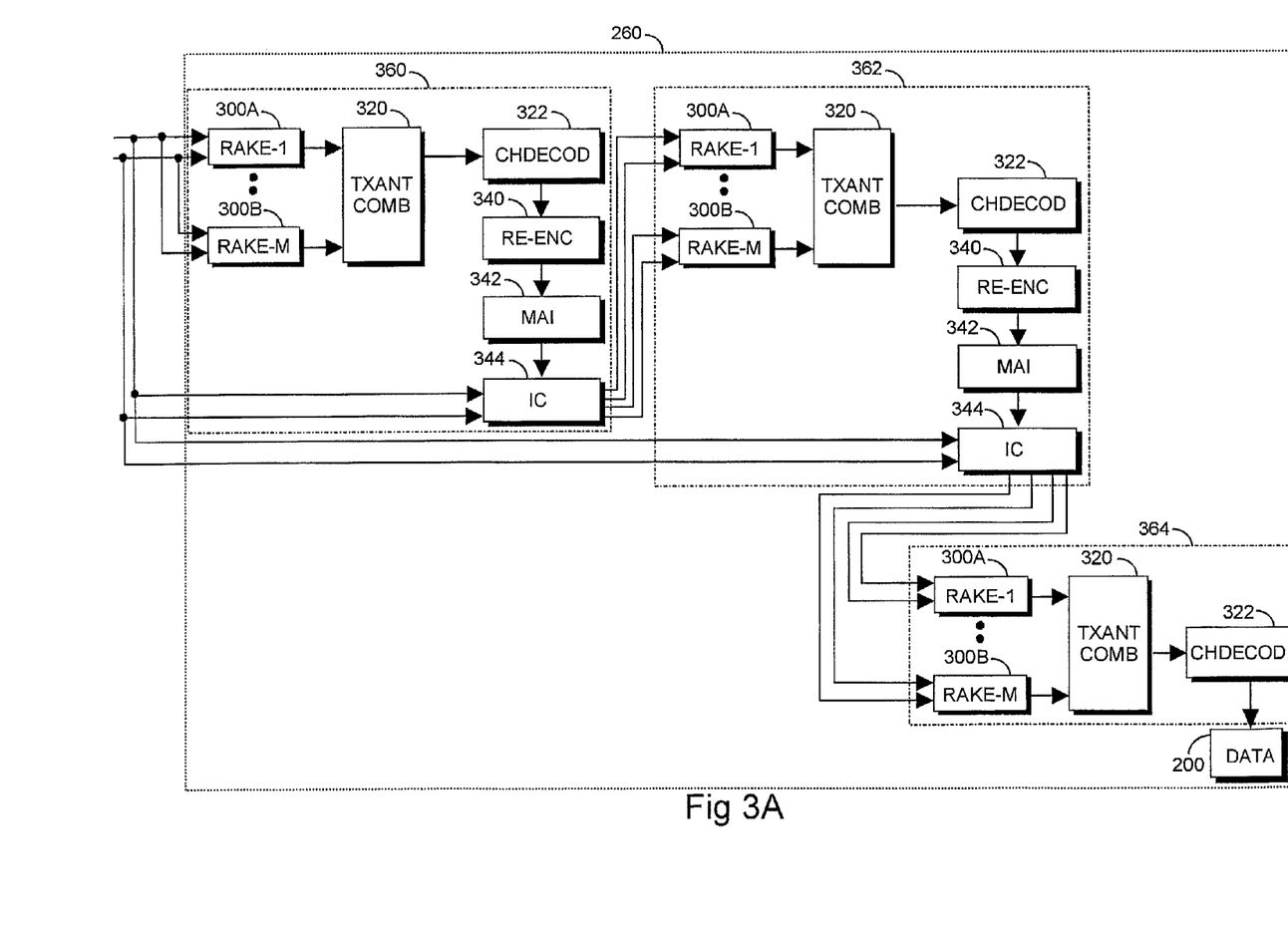
FIGS. 3A and 3B show an example of the structure of a receiver.
Figure 3B:
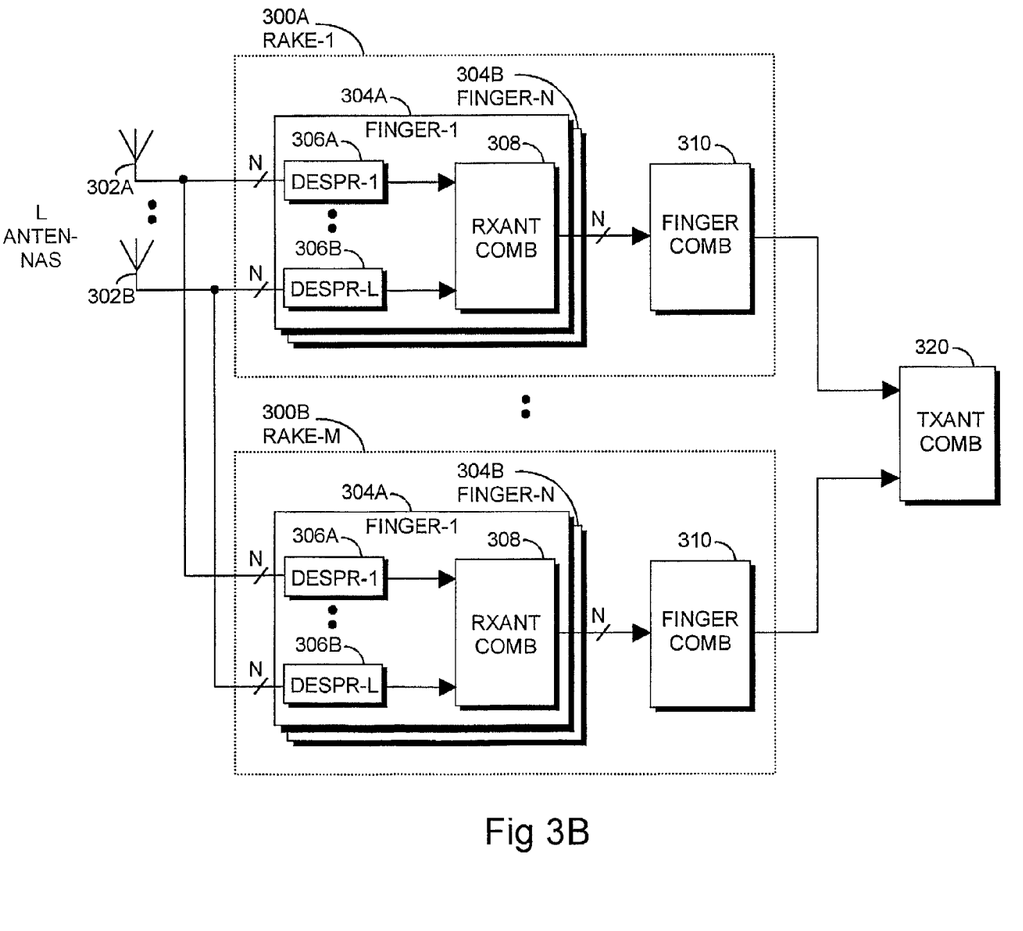

So far, it has mainly been the structure of the transmitter 250 that has been under observation. Next, a simplified block diagram of the structure of a possible receiver 260 is presented with reference to FIGS. 3A and 3B. The receiver 260 can comprise L pieces of receiver antennas 302A, 302B, in which $L \geq 1$. The receiver 260 can thus be an ordinary receiver using one receiver antenna, or it can utilize receiver diversity using more than one receiver antenna. The example of FIGS. 3A and 3B illustrates a receiver used in the CDMA system and formed of Rake receivers 300A, 300B.

The receiver 260 must identify the channel-coding used in the transmitter 250 and the use of diversity before it can begin to detect received data bits. This configuration is performed by the control part (not shown) of the receiver 260, which receives the required data on the control channels of the system, or the control part identifies the channel-coding and diversity by using blind detection.

Each antenna 302A, 302B of the receiver 260 thus receives all signals 224A, 224B transmitted via the M different transmitter antennas 214A, 214B. The receiver 260 comprises M pieces of receivers 300A, 300B connected to each antenna 302A, 302B, in other words as many as there were transmitter antennas 214A, 214B in the transmission. The receiver 260 thus comprises one receiver 300A, 300B per each transmitter antenna 214A, 214B for detecting the signal 224A, 224B transmitted via the transmitter antenna 214A, 214B in question.

The receiver 260 can be a MUD receiver normally used to receive signals from a plurality of users, and then the multiple access interference caused by the other users is estimated and cancelled from the received signal so as to receive the signal of the desired user. In addition to or instead of the cancellation of the other users' interference, signals transmitted using different transmitter antennas 214A, 214B of a single user can be processed in the receiver 260 as if they were signals from different users, whereby their interference cancellation can be performed for the signal of each transmitter antenna 214A, 214B in turn. For the sake of simplicity, FIGS. 3A and 3B only illustrate cancellation of the multiple access interference of the signals of a single user, transmitted via different transmitter antennas 214A, 214B, but other interference cancellation methods can naturally be used as well.

Rake receivers 300A, 300B can be used to distinguish multipath-propagated signal components in the reception. In such a case, the signal components must usually differ from each other by at least one part of the spreading code used, i.e. by one chip. The Rake receiver 300A, 300B comprises Rake fingers 304A, 304B, in each of which fingers despreading of the spectrum takes place. For the sake of clarity, radio frequency parts of the Rake receiver 300A, 300B, for example different filters, are not illustrated.

The Rake finger 304A, 304B comprises a block 306A, 306B, in which the spreading of the received signal is despread, for example by using a matched filter. When receiver diversity is used, the Rake finger may have L pieces of blocks 306A, 306B, i.e. the number of receiver antennas 302A, 302B. When receiver diversity is used, the Rake finger 304A, 304B must also have a combiner 308 of the signals received via different receiver antennas 302A, 302B.

Further, the receiver 260 is provided with a delay estimator (not shown), which has one matched filter per each antenna branch and an allocation block (not shown) of the Rake fingers. In the matched filter, the received signal is correlated with different delays with the spreading code used for spreading the signal, whereby the timing of the spreading code is changed in steps of one chip, for instance. When the correlation is great, a multipath-propagated signal component has been found which can then be received with the identified delay.

In the matched filter, a known number of parallel correlation computations are performed for the received radio signal with different delays to estimate the delays of multipath-propagated signal components. In the correlation computation, the spreading of the pilot part in the received radio signal is despread with a known spreading code by using a predetermined delay.

The allocator in the delay estimator selects on the basis of the computed correlations at least one delay, by means of which the multipath-propagated signal component is received. The allocator allocates the Rake finger 304A, 304B to process the found signal component by reporting it on the found delay. In order to perform the selection in the allocator, the correlation results of each matched filter are typically combined. When the correlation is great, a delay has been found which expresses the delay of the multipath-propagated signal component of the radio signal entering the antenna branch in question. Generally, the strongest multipath components are at the same code phase in all antennas because of the proximity of the antennas and because the radio signals propagate at the speed of light.

In practice, a pre-desired number of Rake fingers 304A, 304B, and/or a number required for the delays exceeding a predetermined threshold value in the correlation computation are allocated. Usually, the limiting factor is the maximum number of Rake fingers 304A, 304B available. The number of signal components depends on the radio conditions and for example on the form of terrain and buildings causing reflections.

In the Rake finger 304A, 304B, each antenna branch is provided with a despreader 306A, 306B, which despreads the spreading of the pilot part in the multipath-propagated signal component using a known spreading code with the delay reported by the delay estimator. Correspondingly, in the Rake fingers 304A, 304B, each antenna branch is provided with a despreader, which despreads the spreading of the data part in the multipath-propagated signal component using a known spreading code with the delay reported by the delay estimator. There are L pieces of despreaders for processing both the data part and the pilot part, i.e. two per each antenna branch in each Rake finger 270A, 304A, 304B. In practice, in the despreading, i.e. in the despreading of the spectrum, the data part or pilot part of the signal component is multiplied with the complex conjugate of the spreading code used, having the correct phase. For the sake of clarity, however, the distinction between the processing of the data part and the pilot part is not illustrated in this context, in other words FIG. 3B only shows one pair of despreaders 306A, 306B.

The diversity combination of multipath-propagated signal components takes place in a block 310. In the example of FIGS. 3A and 3B it is assumed that there are N pieces of multipath-propagated signal components to be received, whereby there are N pieces of Rake fingers: FIG. 3B shows the first Rake finger 304A and the $N^{th}$ Rake finger 304B. Thus, the situation on the whole is such that the delay estimator allocates N pieces of Rake fingers 304A, 304B to the signal components that are heard best. In each Rake finger 304A, 304B, L pieces of antenna branches 302A, 302B are processed. The processing is performed separately for the pilot part of the radio signal and the data part of the radio signal. The number L can vary depending on the conditions, or a threshold value can be set for the level of the multipath-propagated signal component, whereby, when this value is exceeded, the Rake finger 304A, 304B in question is taken into consideration and the receipt is continued. The search for the timing is thus a dynamic process, as is the allocation of the Rake fingers 304A, 304B to be combined.

Then the receiver 260 comprises means 320 for combining the received signals 224A, 224B transmitted via different transmitter antennas 214A, 214B into received channel-coded non-interleaved data. Here, in other words, the signals 208A, 208B separated in the transmission are in a way recombined into one signal.

After this, the channel-coded non-interleaved data is taken to a channel decoder 322, where the channel-coding of the received channel-coded non-interleaved data is decoded. A Viterbi decoder is suitable for decoding convolutional coding, for example.

The receiver 260 comprises interference attenuation means, by means of which interference is attenuated utilizing this decoded data. In the following, there is a description of three examples of embodiments in which interference is attenuated utilizing decoded data.

First, there is a description of the approach shown in FIGS. 3A and 3B, in which the decoded data is taken into a channel encoder 340, where the decoded data is re-encoded using the channel-coding used in the transmission.

Then, the multiple access interference, for example multiple access interference caused by other transmitter antennas 214A, 214B, is estimated in estimating means 342 for the received signal of each transmitter antenna 214A, 214B, utilizing the re-encoded data.

Finally, the multiple access interference, for example multiple access interference caused by other transmitter antennas 214A, 214B, is cancelled in interference cancellation means 344 from the received signal of each transmitter antenna 214A, 214B. The interference cancellation means 344 perform the cancellation of the multiple access interference for selected multipath-propagated signal components of each transmitter antenna 214A, 214B separately, or for a signal combined from the selected multipath-propagated signal components of each transmitter antenna 214A, 214B, or for a signal combined from different transmitter antennas 214A, 214B.

The receiver 260 comprises a predetermined number of interference cancellation stages 360, 362. The interference cancellation stage 360, 362 comprises receivers 300A, 300B, means 320 for combining the signals, channel decoders 324, channel encoders 340, estimating means 342, and interference cancellation means 344. In the example of FIG. 3A, only two interference cancellation stages 360, 362 are illustrated, but there may be more of them, i.e. the number required for cancelling the interference.

After the interference cancellation stages 360, 362, the receiver 260 further comprises stage 364, in which, once more, a signal is detected and its coding decoded. The stage 364 first comprises receivers 300A, 300B for re-detecting the received signal of each transmitter antenna 214A, 214B, purged from multiple access interference. The means 320 are connected to these receivers 214, 214B for re-combining the detected signals into received channel-coded non-interleaved data. Then there is still the channel decoder 324 for finally re-decoding the channel-coding of the received channel-coded non-interleaved data, the result of which is data 200 transmitted over the radio path.

On the radio path, the signal is affected not only by the desired signal but also by noise and interference caused by other users or systems. In systems using diversity, the effect of noise and interference can be reduced for example with the maximal ratio combining (MRC) method, in which signals received via different antennas are emphasized relative to the power of the signal in different antenna branches. Also the IRC method mentioned earlier can be used in this second preferred implementation of interference attenuation means. The IRC method refers here to adaptive beam forming (optimum combination of signals), with which the power of the signal is maximized relative to the power of the interference and noise, in other words the SINR is maximized. The receiver 260 comprises at least two receiver antennas 302A, 302B for receiving a signal. Further, the receiver 260 comprises means for estimating the interference signal in the signal of each receiver antenna 302A, 302B. This estimation can be performed for example by subtracting the regenerated desired signal from the received signal. This interference signal is then utilized by means for forming for each receiver antenna 302A, 302B weighting coefficients that maximize the signal to interference and noise ratio. The receiver 260 further comprises means for multiplying the signal of each receiver antenna 302A, 302B with the weighting coefficient. Said means can in practice be located in the block 310, and they utilize, as mentioned, the regenerated decision information, i.e. decoded data.

A third embodiment of interference attenuation means can utilize the channel equalizer solution mentioned earlier, for example an MLSE equalizer. Also other channel equalizers according to the prior art can be used. Hereby, the interference attenuation means of the receiver 260 comprise a channel equalizer and means for adjusting the channel equalizer of the receiver by utilizing decoded data. The number of channel tap used naturally depends on the number of sufficiently strong multipath-propagated signal components, and on the other hand, on the processing capacity of the channel equalizer. Typically, the channel equalizer is capable of processing a channel onto which 4 to 8 channel taps are formed. The channel equalizer could be located between the blocks 306A and 308, for instance. Hereby, there would be no separate Rake fingers 304A, 304B, but the functionality corresponding to them would exist, i.e. combination of the multipath-propagated components that are heard strongest.

The interference cancellation stages 360, 362 of the described receiver 260 and the stage 364 are implemented by means of programs run in the processor, the parts possibly requiring great computation power being implemented by means of the ASIC.

Figure 4A:
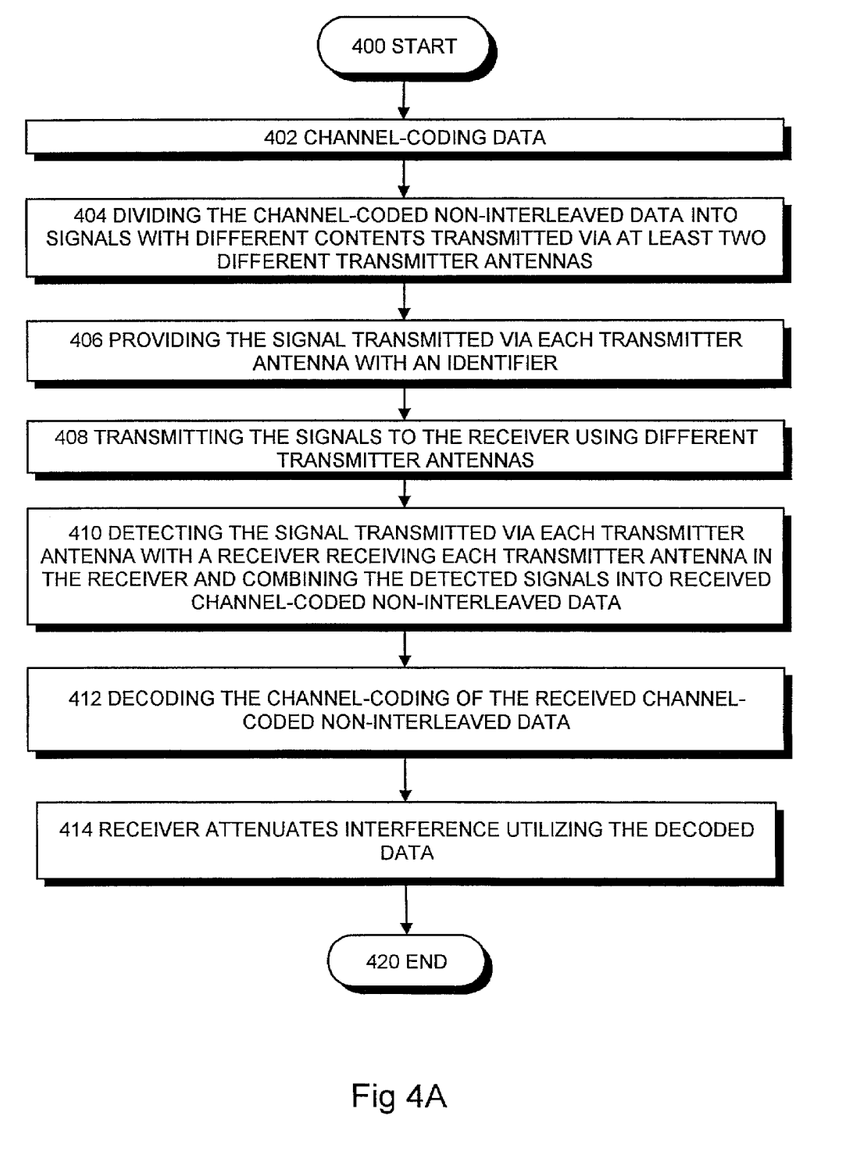
FIG. 4A is a flow chart illustrating a method of transmitting data from a transmitter to a receiver in a radio system.

Next, reference is made to the flow chart of FIG. 4A, which presents a method of transmitting data in a radio system from the transmitter 250 to the receiver 260. The performance of the method is started from block 400. After this, the data is channel-coded in block 402 using the selected channel-coding.

In block 404, the channel-coded non-interleaved data is divided into signals with different contents, to be transmitted via at least two different transmitter antennas.

In block 406, the signal transmitted via each transmitter antenna is provided with an identifier. The signals transmitted via different transmitter antennas are distinguishable from each other in the receiver by means of this identifier.

In block 408, the signals are transmitted to the receiver using different transmitter antennas.

In block 410, the signal transmitted via each transmitter antenna is detected with a receiver receiving each transmitter antenna in the receiver, and the detected signals are combined into received channel-coded non-interleaved data.

In block 412, the channel-coding of the received channel-coded non-interleaved data is decoded.

In block 414, the receiver attenuates interference utilizing decoded data.

Figure 4B:
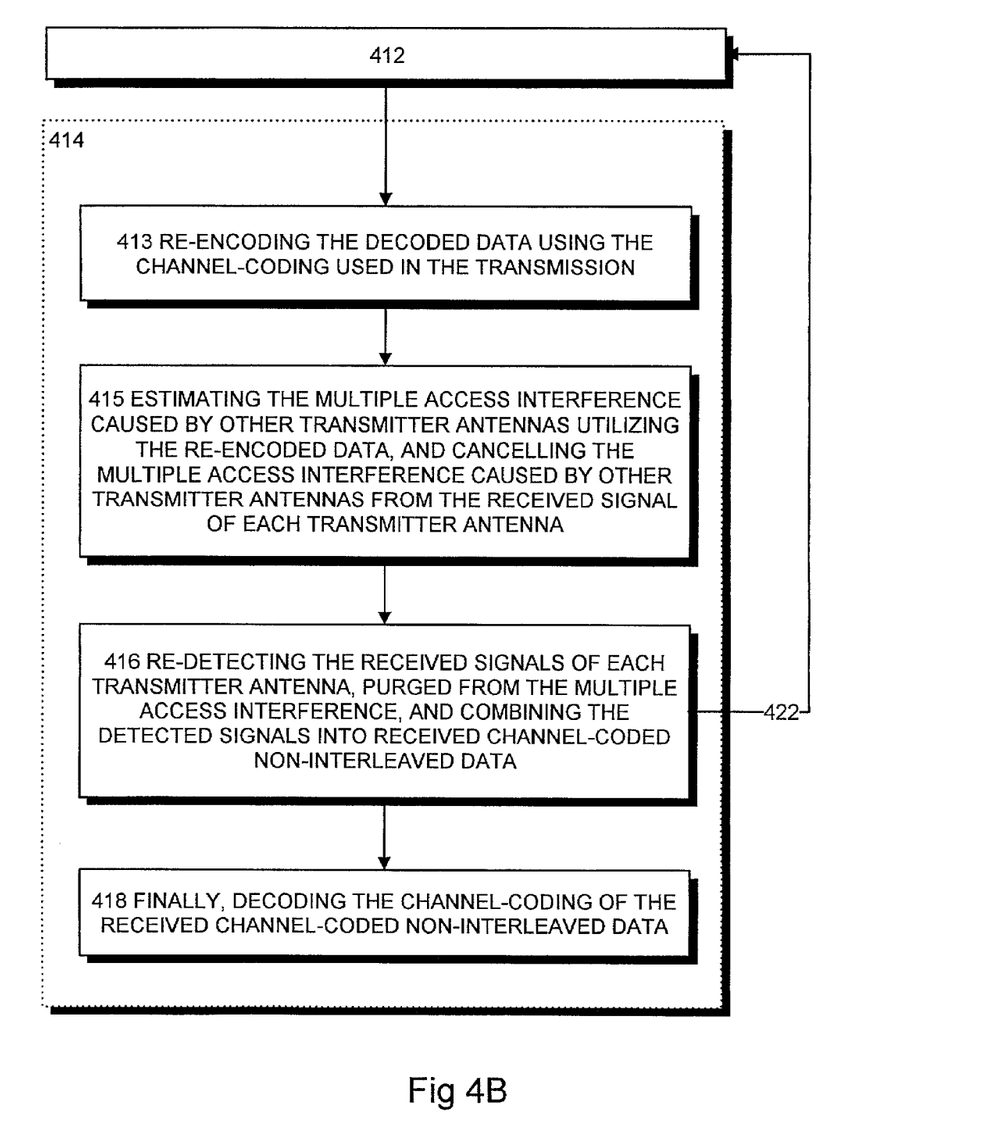
FIG. 4B shows an embodiment of the method illustrated in FIG. 4A.

FIG. 4B illustrates the function performed in a MUD receiver, in other words the operation of the block 414 of FIG. 4A is indicated in more detail.

In block 413, the decoded data is re-encoded using the channel-coding used in the transmission.

Then in block 415, the multiple access interference caused by other transmitter antennas for each transmitter antenna is estimated utilizing the re-encoded data, and the multiple access interference caused by other transmitter antennas is cancelled from the received signal of each transmitter antenna.

In block 416, the received signals of each transmitter antenna, purged from the multiple access interference, are re-detected with receivers, and the detected signals are combined into received channel-coded non-interleaved data.

As was observed earlier in connection with the description of the receiver 260, interference cancellation can be repeated as many times as is required for cancelling the interference or a predetermined number of times. This is indicated in FIG. 4 by arrow 422, which forms the repetition loop of the interference cancellation.

Finally, in block 418, the channel-coding of the received channel-coded non-interleaved data is decoded. In block 420, the performance of the method is terminated, although the method is naturally continuous, in other words it is performed until the desired data is transferred from the transmitter 250 to the receiver 260.

When an ICR receiver is used in the method to attenuate interference, the signal is received using at least two receiver antennas. In block 414, the interference signal in the signal of each receiver antenna is estimated; weighting coefficients that maximize the signal to interference and noise ratio are formed for each receiver antenna; and the signal of each receiver antenna is multiplied with the weighting coefficient.

When the method utilizes a receiver having a channel equalizer, the channel equalizer of the receiver is adjusted in block 414 utilizing decoded data.

Although the invention has been described above with reference to the example according to the attached drawings, it is obvious that the invention is not confined thereto but can be modified in a plurality of ways within the inventive idea defined in the attached claims.

We claim:

1. A method of transmitting data from a transmitter to a receiver in a radio system, comprising:
  channel-coding the data using selected channel-coding;
  dividing the channel-coded non-interleaved data into signals with different contents, to be transmitted via at least two different transmitter antennas;
  providing the signal to be transmitted via each transmitter antenna with an identifier, by means of which identifier the signals transmitted via different transmitter antennas are distinguishable from each other in the receiver;
  transmitting the signals to the receiver using different transmitter antennas;
  detecting the signal transmitted via each transmitter antenna with a receiver receiving each transmitter antenna in the receiver, and combining the detected signals into received channel-coded non-interleaved data;
  decoding the channel-coding of the received channel-coded non-interleaved data;

the receiver attenuating interference utilizing the decoded data, and re-encoding the decoded data in the receiver using the channel-coding used in the transmission;

further comprising, for interference attenuation:
estimating multiple access interference for each transmitter antenna by utilizing the re-encoded data; and cancelling the multiple access interference from the received signal of each transmitter antenna;
re-detecting with receivers the received signals of each transmitter antenna, purged from the multiple access interference; and combining the detected signals into received channel-coded non-interleaved data; and
finally, decoding the channel-coding of the received channel-coded non-interleaved data.

2. A method according to claim 1, wherein the identifier is a spreading code used to spread the signal or a known reference symbol sequence added to the signal.

3. A method according to claim 1, wherein the number of transmitter antennas used in the transmission is dependent on the code rate of the channel-coding used.

4. A method according to claim 1, wherein the number of transmitter antennas used in the transmission is dependent on the constraint length of the channel-coding.

5. A method according to claim 1, wherein the transmitter antennas are spatial diversity antennas.

6. A method according to claim 1, wherein the transmitter antennas are polarization diversity antennas.

7. A method according to claim 1, wherein the transmitter antennas implementing angle diversity use directed antenna beams.

8. A method according to claim 1, further comprising:
repeating the detection and combination of the signal, the decoding of the channel-coding of the received data, and the re-encoding, as well as the estimation and cancellation of the multiple access interference as many times as is required for cancelling the interference, or a predetermined number of times.

9. A method according to claim 1, further comprising:
performing the cancellation of the multiple access interference for selected multipath-propagated signal component of each transmitter antenna separately, or for a signal combined from the selected multipath-propagated signal components of each transmitter antenna, or for a signal combined from different transmitter antennas.

10. A method according to claim 1, wherein in the receiver for interference attenuation:
the channel equalizer of the receiver is adjusted by utilizing the decoded data.

11. A method of transmitting data from a transmitter to a receiver in a radio system, comprising:
channel-coding the data using selected channel-coding;
dividing the channel-coded non-interleaved data into signals with different contents, to be transmitted via at least two different transmitter antennas;
providing the signal to be transmitted via each transmitter antenna with an identifier, by means of which identifier the signals transmitted via different transmitter antennas are distinguishable from each other in the receiver;
transmitting the signals to the receiver using different transmitter antennas;
detecting the signal transmitted via each transmitter antenna with a receiver receiving each transmitter antenna in the receiver, and combining the detected signals into received channel-coded non-interleaved data;
decoding the channel-coding of the received channel-coded non-interleaved data;
the receiver attenuating interference utilizing the decoded data, and
computing a quality value for the received signal of each transmitter antenna in the receiver; transmitting the computed quality value or the control data formed on the basis of the quality value back to the transmitter; and the transmitter making a decision on the transmission power of each transmitter antenna on the basis of the computed quality values or the control data.

12. A method of transmitting data from a transmitter to a receiver in a radio system, comprising:
channel-coding the data using selected channel-coding;
dividing the channel-coded non-interleaved data into signals with different contents, to be transmitted via at least two different transmitter antennas;
providing the signal to be transmitted via each transmitter antenna with an identifier, by means of which identifier the signals transmitted via different transmitter antennas are distinguishable from each other in the receiver;
transmitting the signals to the receiver using different transmitter antennas;
detecting the signal transmitted via each transmitter antenna with a receiver receiving each transmitter antenna in the receiver, and combining the detected signals into received channel-coded non-interleaved data;
decoding the channel-coding of the received channel-coded non-interleaved data;
the receiver attenuating interference utilizing the decoded data,
wherein in the receiver for interference attenuation:
a signal is received using at least two receiver antennas;
the interference signal in the signal of each receiver antenna is estimated;
weighting coefficients that maximize the signal to interference and noise ratio are formed for each receiver antenna;
and the signal of each receiver antenna is multiplied with the weighting coefficient.

13. A radio system comprising a transmitter and a receiver connected to a transmitter, which transmitter comprises a channel encoder for channel-coding data and at least two transmitter antennas for transmitting the channel-coded data, and the receiver comprises a receiver per each transmitter antenna for detecting the signal transmitted via the transmitter antenna in question,
and the transmitter further comprises:
means for dividing the channel-coded non-interleaved data into signals with different contents, to be transmitted via at least two different transmitter antennas; and
means for providing the signal to be transmitted via each transmitter antenna with an identifier, by means of which identifier the signals transmitted via different transmitter antennas are distinguishable from each other in the receiver;
and the receiver further comprises:
means for combining the signals transmitted via different transmitter antennas into received, channel-coded non-interleaved data;
a channel decoder for decoding the channel-coding of the received channel-coded non-interleaved data; and
interference attenuation means for attenuating interference by utilizing the decoded data, wherein the receiver further comprises a channel encoder for re-encoding the decoded data by using the channel-coding used in the transmission;

and the interference attenuation means comprise:

estimating means for estimating multiple access interference for the received signal of each transmitter antenna by utilizing the re-encoded data;

interference cancellation means for cancelling the multiple access interference from the received signal of each transmitter antenna;

receivers for re-detecting the received signal of each transmitter antenna, purged from the multiple access interference;

means for re-combining the detected signals into received channel-coded non-interleaved data; and a channel encoder for finally re-decoding the channel-coding of the received channel-coded non-interleaved data.

14. A radio system according to claim 13, wherein the identifier is a spreading code used for spreading a signal, or a known reference symbol sequence added to the signal.

15. A radio system according to claim 13, wherein the number of transmitter antennas used in the transmission depends on the code rate of the channel-coding used.

16. A radio system according to claim 13, wherein the number of transmitter antennas depends on the constraint length of the channel-coding used.

17. A radio system according to claim 13, wherein the transmitter antennas are spatial diversity antennas.

18. A radio system according to claim 13, wherein the transmitter antennas are polarization diversity antennas.

19. A radio system according to claim 13, wherein the transmitter antennas implement angle diversity by using directed antenna beams.

20. A radio system according to claim 13, wherein the receiver comprises a predetermined number of interference cancellation stages, which interference cancellation stage comprises receivers, means for combining the signals, channel decoders, channel encoders, estimating means, and interference cancellation means.

21. A radio system according to claim 13, wherein the interference cancellation means perform cancellation of the multiple access interference for selected multipath-propagated signal components of each transmitter antenna separately, or for a signal combined from the selected multipath-propagated signal components, or for a signal combined from different transmitter antennas.

22. A radio system according to claim 13, wherein the interference attenuation means of the receiver comprise:

a channel equalizer;

and means for adjusting the channel equalizer by utilizing the decoded data.

23. A radio system comprising a transmitter and a receiver connected to a transmitter, which transmitter comprises a channel encoder for channel-coding data and at least two transmitter antennas for transmitting the channel-coded data, and the receiver comprises a receiver per each transmitter antenna for detecting the signal transmitted via the transmitter antenna in question, and the transmitter further comprises:

means for dividing the channel-coded non-interleaved data into signals with different contents, to be transmitted via at least two different transmitter antennas;

and means for providing the signal to be transmitted via each transmitter antenna with an identifier, by means of which identifier the signals transmitted via different transmitter antennas are distinguishable from each other in the receiver;

and the receiver further comprises:

means for combining the signals transmitted via different transmitter antennas into received, channel-coded non-interleaved data;

a channel decoder for decoding the channel-coding of the received channel-coded non-interleaved data; and interference attenuation means for attenuating interference by utilizing the decoded data, wherein the transmitter comprises means for changing the code rate and the number of transmitter antennas adaptively, and wherein when the code rate is kept the same and the number of transmitter antennas is increased, the transmission speed of the data to be transmitted is increased.

24. A radio system comprising a transmitter and a receiver connected to a transmitter, which transmitter comprises a channel encoder for channel-coding data and at least two transmitter antennas for transmitting the channel-coded data, and the receiver comprises a receiver per each transmitter antenna for detecting the signal transmitted via the transmitter antenna in question, and the transmitter further comprises:

means for dividing the channel-coded non-interleaved data into signals with different contents, to be transmitted via at least two different transmitter antennas; and means for providing the signal to be transmitted via each transmitter antenna with an identifier, by means of which identifier the signals transmitted via different transmitter antennas are distinguishable from each other in the receiver;

and the receiver further comprises:

means for combining the signals transmitted via different transmitter antennas into received, channel-coded non-interleaved data;

a channel decoder for decoding the channel-coding of the received channel-coded non-interleaved data; and interference attenuation means for attenuating interference by utilizing the decoded data, wherein the receiver further comprises means for computing a quality value for the received signal of each transmitter antenna, and the transmitter comprises means for making a decision on the transmission power of each transmitter antenna on the basis of the computed quality values or the quality values of the receiver.

25. A radio system comprising a transmitter and a receiver connected to a transmitter, which transmitter comprises a channel encoder for channel-coding data and at least two transmitter antennas for transmitting the channel-coded data, and the receiver comprises a receiver per each transmitter antenna for detecting the signal transmitted via the transmitter antenna in question, and the transmitter further comprises:

means for dividing the channel-coded non-interleaved data into signals with different contents, to be transmitted via at least two different transmitter antennas; and means for providing the signal to be transmitted via each transmitter antenna with an identifier, by means of which identifier the signals transmitted via different transmitter antennas are distinguishable from each other in the receiver;

and the receiver further comprises:

means for combining the signals transmitted via different transmitter antennas into received, channel-coded non-interleaved data;

a channel decoder for decoding the channel-coding of the received channel-coded non-interleaved data; and interference attenuation means for attenuating interference by utilizing the decoded data, wherein the interference attenuation means of the receiver comprise:

at least two receiver antennas for receiving a signal;

means for estimating the interference signal in the signal of each receiver antenna;

means for forming for each receiver antenna weighting coefficients that maximize the signal to interference and noise ratio; and means for multiplying the signal of each receiver antenna with the weighting coefficient.

26. A radio system receiver comprising:

a sub-component configured to combine signals transmitted via at least two different transmitter antennas into received, channel-coded non-interleaved data;

a channel decoder configured to decode the channel-coding of the received channel-coded non-interleaved data;

and an interference attenuator configured to attenuate interference by utilizing the decoded data, wherein the signals transmitted via different transmitter antennas are channel encoded prior to transmission and the receiver further comprises a receiver antenna per each transmitter antenna for detecting the signal transmitted via the transmitter antenna in question, wherein the channel-coded, non-interleaved data transmitted via the different transmitter antenna are divided into signals with different contents, which are transmitted via the at least two different transmitter antennas; and wherein the signal received from each transmitter antenna includes an identifier which enables the received signals to distinguishable from each others wherein the decoded data in the receiver is re-encoded using the channel-coding used in the transmission; and for interference attenuation:

multiple access interference is estimated for each transmitter antenna by utilizing the re-encoded data; and the multiple access interference is cancelled from the received signal of each transmitter antenna;

the received signals of each transmitter antenna are re-detected with receivers, purged from the multiple access interference; the detected signals are combined into received channel-coded non-interleaved data; and the channel-coding of the received channel-coded non-interleaved data are decoded.

27. The radio system receiver of claim 26, wherein the transmission speed of the transmitted data is increased by keeping the code rate the same and increasing the number of transmitter antennas.

28. The radio system receiver of claim 26, wherein the transmission speed of the transmitted data is maintained the same by reducing the code rate and correspondingly increasing the number of transmitter antennas.

29. The radio system receiver of claim 26, wherein a quality value for the received signal of each transmitter antenna in the receiver is computed, the computed quality value or the control data formed on the basis of the quality value is transmitted back to the transmitter; and the transmitter makes a decision on the transmission power of each transmitter antenna on the basis of the computed quality values or the control data.

30. An integrated circuit comprising:

a channel encoder configured to channel-encode non-interleaved data for subsequent transmission by at least two transmitter antennas, a controller configured to cooperate with the channel encoder to divide the channel-coded non-interleaved data into signals with different contents, to be transmitted via the at least two transmitter antennas, and a sub-component configured to provide the signal to be transmitted via each transmitter antenna with an identifier which enables signals transmitted via different transmitter antennas to be distinguishable from each other in a receiver, wherein the decoded data in the receiver is re-encoded using the channel-coding used in the transmission;

and for interference attenuation:

multiple access interference is estimated for each transmitter antenna by utilizing the re-encoded data; and the multiple access interference is cancelled from the received signal of each transmitter antenna;

the received signals of each transmitter antenna are re-detected with receivers, purged from the multiple access interference; the detected signals are combined into received channel-coded non-interleaved data; and the channel-coding of the received channel-coded non-interleaved data are decoded.

31. The integrated circuit of claim 30, wherein the channel equalizer of the receiver is adjusted by utilizing the decoded data.

32. An integrated circuit comprising:

a channel encoder configured to channel-encode non-interleaved data for subsequent transmission by at least two transmitter antennas, a controller configured to cooperate with the channel encoder to divide the channel-coded non-interleaved data into signals with different contents, to be transmitted via the at least two transmitter antennas, and a sub-component configured to provide the signal to be transmitted via each transmitter antenna with an identifier which enables signals transmitted via different transmitter antennas to be distinguishable from each other in a receiver, wherein a quality value for the received signal of each transmitter antenna in the receiver is computed, the computed quality value or the control data formed on the basis of the quality value is transmitted back to the transmitter; and the transmitter makes a decision on the transmission power of each transmitter antenna on the basis of the computed quality values or the control data.

* * * * *